(12) United States Patent
Islam et al.

(10) Patent No.: US 6,282,619 B1
(45) Date of Patent: Aug. 28, 2001

(54) LOGICAL DRIVE MIGRATION FOR A RAID ADAPTER

(75) Inventors: Shah Mohammad Rezaul Islam, Cary; Bharatkumar Jayantilal Oza, Apex; Philip Anthony Richardson, Cary, all of NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/179,150

(22) Filed: Oct. 26, 1998

Related U.S. Application Data

(62) Division of application No. 08/887,391, filed on Jul. 2, 1997.

(51) Int. Cl.[7] .................................................. G06F 12/02
(52) U.S. Cl. ........................................ 711/165; 711/114
(58) Field of Search ............................ 711/112, 113, 711/114, 165

(56) References Cited

U.S. PATENT DOCUMENTS 5,392,244 * 2/1995 Jacobson et al. .................... 711/114
5,875,456 * 2/1999 Stallmo et al. ...................... 711/114
5,875,457 * 2/1999 Shalit .................................. 711/114

* cited by examiner

Primary Examiner—Kevin L. Ellis
(74) Attorney, Agent, or Firm—Martin J. McKinley

(57) ABSTRACT

A method for migrating data from one level of RAID system to the same or another level of RAID system having the same or a different number of removable and identifiable storage devices and having the same or a different stripe unit size is disclosed. The storage devices can be attached to the system at a number of different attachment points which facilitates replacement or removal of a failed device. The system is represented as a logical media drive. After determining the number of migrations and the direction of migration, a start logical block address and an end logical block address is defined. The migration is performed by moving data from the source physical blocks to the destination physical blocks starting with the physical block corresponding to the start logical block address and continuing to the physical block corresponding to the end logical block address.

5 Claims, 4 Drawing Sheets

| Rx->Ry | Condition | Dir | SB1 | EB1 | SB2 | EB2 |
|---|---|---|---|---|---|---|
| R0->R0 | NCD >= NCS | TD | 0 | min{EBSmax,EBDmax} | N/A | N/A |
|  | NCD < NCS | BU | min{EBSmax,EBDmax} | 0 | N/A | N/A |
| R0->R1 | NCD > 2NCS | TD | 0 | min{EBSmax,EBDmax} | N/A | N/A |
|  | NCD <= 2NCS | BU | min{EBSmax,EBDmax} | 0 | N/A | N/A |
| R0->R5 | NCD <= NCS+1 | BU | min{EBSmax,EBDmax} | 0 | N/A | N/A |
|  | NCD > NCS+1  i | BU | (NCD-2)*SUS | 0 | N/A | N/A |
|  | ii | TD | N/A | N/A | (NCD-1)*SUS | min{EBSmax,EBDmax} |
| R1->R0 | 2NCD > NCS | TD | 0 | min{EBSmax,EBDmax} | N/A | N/A |
|  | 2NCD <= NCS | BU | min{EBSmax,EBDmax} | 0 | N/A | N/A |
| R1->R1 | NCD >= NCS | TD | 0 | min{EBSmax,EBDmax} | N/A | N/A |
|  | NCD < NCS | BU | min{EBSmax,EBDmax} | 0 | N/A | N/A |
| R1->R5 | 2(NCD-1) <= NCS | BU | min{EBSmax,EBDmax} | 0 | N/A | N/A |
|  | 2(NCD-1) > NCS  i | TD | N/A | N/A | (NCD-1)*SUS | min{EBSmax,EBDmax} |
|  | (order i/ii imp)  ii | BU | (NCD-2)*SUS | 0 | N/A | N/A |
| R5->R0 | NCD > NCS-2 | TD | 0 | min{EBSmax,EBDmax} | N/A | N/A |
|  | NCD <= NCS-2  i | TD | 0 | N/A | N/A | N/A |
|  | ii | BU | N/A | NCD-1)*SUS  N/A | min{EBSmax,EBDmax} | (NCD)*SUS |
| R5->R1 | NCD >= 2(NCS-1) | TD | 0 | min{EBSmax,EBDmax} | N/A | N/A |
|  | NCD < 2(NCS-1)  i | TD | 0 | N/A | N/A | N/A |
|  | ii | BU | N/A | (NCD-1)*SUS  N/A | min{EBSmax,EBDmax} | (NCD)*SUS |
| R5->R5 | NCD >= NCS | TD | 0 | min{EBSmax,EBDmax} | N/A | N/A |
|  | NCD < NCS  i | TD | 0 | (NCD-2)*SUS | N/A | N/A |
|  | ii | BU | N/A | N/A | min{EBSmax,EBDmax} | (NCD-1)*SUS |

FIG. 4

| Rx->Ry | Condition | Dir | SB1 | EB1 | SB2 | EB2 |
|---|---|---|---|---|---|---|
| R0->R0 | NCD >= NCS<br>NCD < NCS | TD<br>BU | 0<br>min{EBSmax,EBDmax} | min{EBSmax,EBDmax}<br>0 | N/A<br>N/A | N/A<br>N/A |
| R0->R1 | NCD > 2NCS<br>NCD <= 2NCS | TD<br>BU | 0<br>min{EBSmax,EBDmax} | min{EBSmax,EBDmax}<br>0 | N/A<br>N/A | N/A<br>N/A |
| R0->R5 | NCD <= NCS+1<br>NCD > NCS+1<br>(order i/ii) | BU<br>BU<br>TD<br>ii | min{EBSmax,EBDmax}<br>(NCD-2)*SUS<br>N/A | 0<br>0<br>N/A | N/A<br>N/A<br>(NCD-1)*SUS | N/A<br>N/A<br>min{EBSmax,EBDmax} |
| R1->R0 | 2NCD > NCS<br>2NCD <= NCS | TD<br>BU | 0<br>min{EBSmax,EBDmax} | min{EBSmax,EBDmax}<br>0 | N/A<br>N/A | N/A<br>N/A |
| R1->R1 | NCD >= NCS<br>NCD < NCS | TD<br>BU | 0<br>min{EBSmax,EBDmax} | min{EBSmax,EBDmax}<br>0 | N/A<br>N/A | N/A<br>N/A |
| R1->R5 | 2(NCD-1) <= NCS<br>2(NCD-1) > NCS<br>(order i/ii imp) | BU<br>TD<br>BU<br>ii | min{EBSmax,EBDmax}<br>N/A<br>(NCD-2)*SUS | 0<br>N/A<br>0 | N/A<br>(NCD-1)*SUS<br>N/A | N/A<br>min{EBSmax,EBDmax}<br>N/A |
| R5->R0 | NCD > NCS-2<br>NCD <= NCS-2 | TD<br>TD<br>BU<br>ii | 0<br>0<br>N/A | min{EBSmax,EBDmax}<br>NCD-1)*SUS<br>N/A | N/A<br>min{EBSmax,EBDmax}<br>N/A | N/A<br>(NCD)*SUS<br>N/A |
| R5->R1 | NCD >= 2(NCS-1)<br>NCD < 2(NCS-1)<br>ii | TD<br>TD<br>BU | 0<br>0<br>N/A | min{EBSmax,EBDmax}<br>(NCD-1)*SUS<br>N/A | N/A<br>min{EBSmax,EBDmax}<br>N/A | N/A<br>(NCD)*SUS<br>N/A |
| R5->R5 | NCD >= NCS<br>NCD < NCS<br>ii | TD<br>TD<br>BU | 0<br>0<br>N/A | min{EBSmax,EBDmax}<br>(NCD-2)*SUS<br>N/A | N/A<br>min{EBSmax,EBDmax}<br>N/A | N/A<br>(NCD-1)*SUS<br>N/A |

LOGICAL DRIVE MIGRATION FOR A RAID ADAPTER

CROSS REFERENCE TO RELATED APPLICATIONS

This application is a division of application Ser. No. 08/887,391 filed Jul. 2, 1997, which is entitled "RAID Array Configuration Synchronization At Power On.

BACKGROUND OF THE INVENTION

This invention pertains to computers and other information processing systems and, more particularly, to an information processing system that includes a redundant array of inexpensive disks ("RAID") with a means for synchronizing the disk configuration data.
RAID Overview As the performance of microprocessor and semiconductor memory technology increases, there is a need for improved magnetic disk storage technology with comparable performance enhancements. Unfortunately, the performance of newer processor and semiconductor memory technology has out paced that of magnetic disk storage technology. In 1988, however, a paper published by Patterson, Gibson and Katz ("A Case For Redundant Arrays Of Inexpensive Disks (RAID)"; International Conference On Management Of Data; pp. 109–116; June 1988) laid the foundation for the use of a redundant array of inexpensive disks ("RAID") that would not only significantly improve the data transfer rate and data I/O rate over a comparable single disk access, but would also provide error correcting redundancy and lower cost. In their paper, Patterson, Gibson and Katz described five "levels" of RAID systems, which are briefly described below (RAID-1 through RAID-5). Since that time, other RAID levels have been described, two of which are also briefly described below (RAID-0 and RAID-6).

Most RAID systems incorporate both redundancy and some form of data interleaving, which distributes the data over all the data disks in the array. Redundancy is usually in the form of an error correcting code, with simple parity schemes predominating. However, RAID-1 uses a "mirroring" redundancy scheme in which duplicate copies of the same data are stored on two separate disks in the array. Parity and other error correcting codes are either stored on one or more disks dedicated for that purpose only, or they may be distributed over all the disks in the array. Data interleaving is usually in the form of data "striping" in which the data to be stored is broken down into blocks called "stripe units", which are then distributed across the data disks. A typical size of a stripe unit is 8K to 64K Bytes. A "stripe" is a group of corresponding stripe units, one stripe unit from each disk in the array. Thus, the "stripe size" is equal to the size of a stripe unit times the number of data disks in the array. Data interleaving may also be accomplished on a bit-by-bit basis, such as is described in more detail below with regards to RAID-3. Six RAID levels will now be described.

RAID-0 utilizes data striping, but does not use redundancy. RAID-0 has a lower cost than any other RAID level, and its write performance is the best because there is no writing of redundant information. The primary disadvantage of RAID-0 is its lack of redundancy. Consequently, any single disk failure in the array results in lost data.

RAID-1 uses mirroring in which identical data is stored on two disks. An advantage of RAID-1 is that it is simple to implement in software. RAID-1 is also error correcting because complete recovery is possible from the failure of any one disk drive by simply switching to the drive that contains the duplicate copy of the data. After replacing the defective drive, the data on the duplicate drive can be recopied to the replacement drive. When servicing two or more requests to read data that is stored on the same disk, RAID-1 has a faster read rate than RAID-0 because one request can be serviced from the first disk, and the second request can be simultaneously serviced by the duplicate disk. A disadvantage of RAID-1 is that it is expensive because it requires two times the number of drives necessary to stored the same data. Thus, its efficiency is always ½. The necessity of making duplicate copies of all data also makes this RAID level somewhat slow to write data.

RAID-2 uses error correcting codes such as those found in error correcting semiconductor memory systems.

RAID-3 uses a separate parity disk to store error correcting parity information and a plurality of data disks that contain bit interleaved data information. Unlike semiconductor memories, a faulty disk drive is usually easily identified because disk drives and their associated controllers typically contain sophisticated error detecting mechanisms that can quickly identify a failed drive. Consequently, if a single data drive has failed, the contents of the failed drive can be easily reconstructed using the information from the "good" data drives plus the parity drive. Conceptually, the reconstruction of a specific bit of a failed drive could be accomplished by calculating the parity of the corresponding bit of each of the "good" drives and then comparing it to the corresponding bit of the parity drive. For example, if the parity of the first bit of each of the "good" drives is a logical 0, and the first bit of the parity drive is a logical 1, then the first bit of the failed drive must have been a logical 1 (because the parity of the first bit of all the data drives must equal logical 1, in this example). Mathematically speaking, the data on the failed disk can be calculated by starting with the parity information from the parity drive and subtracting, modulo two, the corresponding information on the "good" data drives. If, on the other hand, the parity drive fails, parity is easily reconstructed from all the data drives.

For this RAID level, data is bit interleaved on the data disks. For example, a basic RAID-3 system in which data is organized in 8 bit bytes and having 8 data disks and one parity disk would store the first bit of every byte on the first disk, the second bit of every byte on the second disk, on so on. Thus, a write request simultaneously accesses all 8 data disks plus the parity disk, while a read request accesses all 8 data disks. Consequently, the data rate, which is the rate at which data can be written to or read from sequential locations on the disk without head repositioning, is very high for RAID-3. A primary disadvantage of this RAID level is that it only permits one request to be serviced at any one time. RAID-3 systems also have relatively low I/O rates, which is the rate at which data can be written to random locations on the disk, thereby requiring frequent head repositioning.

RAID-4 also uses a separate parity disk to store error correcting parity information and a plurality of data disks that contain interleaved data information. Unlike RAID-3, in which data is bit interleaved across the data disks, RAID-4 uses block interleaving or data striping, which is described in more detail above.

The performance of RAID-4 is particularly dependent on the type of access requested, read or write, and the size of the requested access relative to the size of the stripe unit and the size of the stripe. A request to read a block of data that is contained entirely within one stripe unit can be quickly serviced as soon as the disk drive containing the requested data becomes available. Consequently, multiple requests to read various blocks of data, each of which is entirely contained within one stripe unit on a different data drive, can be serviced simultaneously. In contrast, a RAID-3 system must service multiple requests serially, and if head repositioning is required between the servicing of each request, the performance of a RAID-3 system will be dramatically slower than a RAID-4 system for this type of access. A read operation of stripe size data blocks can also be very fast in RAID-4, particularly if scheduling permits all data disks to be accessed at one time.

A request to write data to a single stripe unit can be a relatively slow process, because it requires four disk accesses. Specifically, a data write to a single stripe unit requires that the old data and corresponding parity information be read from the appropriate data disk and the parity disk. Next, new parity information is computed using the old data, the new data and the old parity. Finally, the new data and the new parity are written to the data and parity disks, respectively. Requests for multiple writes to various stripe units located on different drives and in different stripes is even more problematic, because each write requires a read and write operation to the parity disk and, since there is only one parity disk, it can become "bottle necked." Writing an entire stripe of data is much easier because no read operations are required and the parity for the new stripe of data is easily computed.

RAID-5 is similar to RAID-4 in that it interleaves data by stripe units across the various disk drives, and also stores error correcting parity information. In RAID-5, however, there is no dedicated parity disk as there is in RAID-3 and RAID-4. Instead, RAID-5 distributes parity across all the disk drives, thereby eliminating the parity disk bottleneck problem described above with regards to certain write operations of RAID-4 systems. Furthermore, because RAID-5 distributes data over al the disks, and RAID-4 only distributes data over the data disks (which is equal to the total number of disks minus the total number of parity disks), RAID-5 has a slight performance advantage over RAID-4. With these performance enhancements, RAID-5 is usually preferred over RAID-4 and, consequently, most RAID-4 systems have disappeared from the market to be replaced by RAID-5 systems.

RAID-6 is similar to RAID-5 in that it interleaves data in stripe units and distributes parity information across all the disk drives. A disadvantage of RAID-5, as well as RAID-3 and RAID-4, is its inability to correct a failure in more than one single disk. As the size of disk arrays increases, however, the probability of a failure in more than one drive also increases which, in turn, increases the chance of an unrecoverable failure. To overcome the problem of a two disk failure, RAID-6 uses Reed-Solomon codes in a P+Q redundancy scheme that can recover from a failure of any two disks. One disadvantage of RAID-6 over RAID-5, however, is in the write performance of small amounts of data on the order of one stripe unit in size. Recall that writes of small amounts of data are slow in RAID-5 because four data accesses are required. For such small write operations, RAID-6 is even more inefficient because it requires a total of six accesses to update both the "P" and "Q" information.

There has been a long felt need for a RAID adapter wherein data could be migrated from one configuration to another. This may involve adding or removing physical disk devices or the existing RAID level of a logical drive (array) may be changed to provide better fault tolerance for the data. This traditionally requires backing up the data, defining a new logical drive, and then restoring the data.

SUMMARY OF THE INVENTION

Briefly, the invention is a RAID system for use with removable and identifiable storage devices that can be attached to the RAID system at a plurality of different attachment points. The RAID system includes means for storing configuration data, wherein the configuration data is indicative of a system configuration in which a plurality of removable storage devices are configured for attachment to the RAID system. The configuration data includes information regarding the identity, attachment point and the operational state of each one of the plurality of storage devices.

This invention allows a user to change the RAID level of an existing logical drive, or to migrate logical drive data by simply issuing a Logical Drive Migration command to the adapter, which then performs the method of the invention to provide a redefined logical drive configuration structure.

This invention also permits a user to migrate logical drive data belonging to one RAID level to another RAID level. The primary objective of this function is to provide a mechanism for changing RAID levels. It also allows, with some restrictions, shrinkage and expansion of the logical drive size.

The logical drive migration method examines the number of source devices, the number of destination devices, the RAID level change requested and the associated stripe unit size to determine the start block, end block, and direction in which to migrate logical drive data. The method determines whether Top Down (TD), Bottom UP (BU) or combinations of TD and BU are to be used as the direction in which data must be migrated to preserve data integrity and then migrates the data by moving data from the source physical blocks to the destination physical blocks starting with the physical block corresponding to the start logical block address and continuing to the physical block corresponding to the end logical block address.

BRIEF DESCRIPTION OF THE DRAWINGS

FIG. 4 is a diagram of an algorithm for logical drive migration.

Table 1 is a code table that lists the configuration data that is stored in each of the disk drive units attached to the system, and is also stored in the RAID controller's NVRAM and flash memory.

Table 2 is a code table that lists the system management data that is stored in each of the disk drive units attached to the system, and is also stored in the RAID controller's NVRAM and flash memory.

DESCRIPTION OF THE ILLUSTRATIVE EMBODIMENTS

Figure 1:
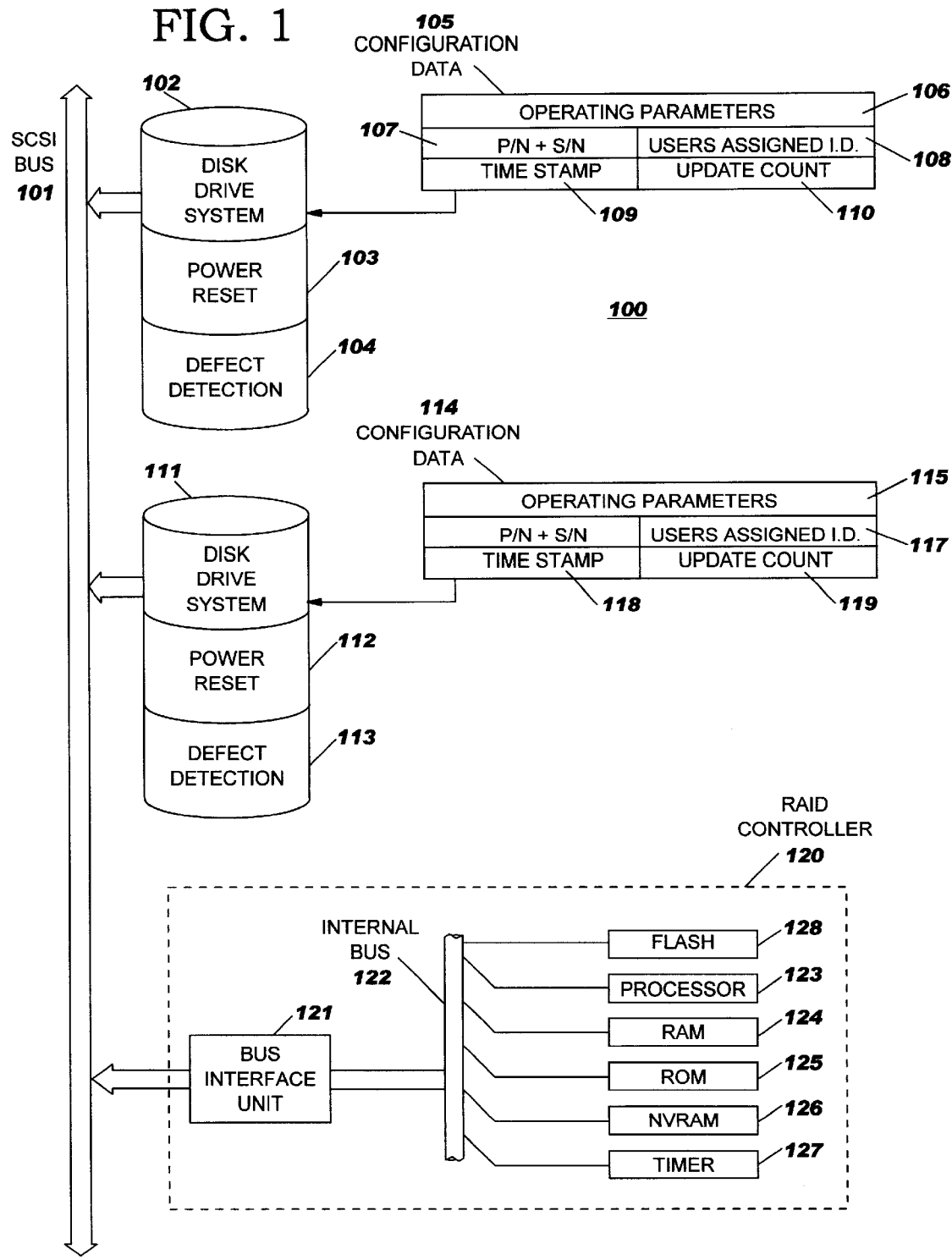
FIG. 1 is a block diagram of a RAID system of the present invention.

Referring to FIG. 1, the RAID system 100 of the preferred embodiment includes a Small Computer System Interface ("SCSI") bus 101, although other bus architectures may also be used. A disk drive unit 102 can be connected to bus 101, but is illustrated in FIG. 1 as being disconnected from the bus. Disk drive unit 102 includes a well known power reset subsystem 103 that sends a signal out over bus 101 to indicate that a power reset has just occurred. For disk drive units that are designed to be attached to a SCSI bus, the signal that is sent out over the bus in response to a power reset is well known in the art and is commonly called a "unit attention error" signal. Disk drive unit 102 also includes a well known error or defect detection subsystem 104 that can detect defects in the disk drive unit.

Configuration data 105 is stored in disk drive unit 102, for example, in the last 16 sectors of the disk. The configuration data is illustrated in more detail in Table 1, which is a computer code listing of all the data that, collectively, makes up the configuration data. The configuration data 105 includes operating parameter data 106 that includes information about the state or status of the disk drive unit, as well as other operating parameters.

For example, the current state of a disk drive is indicated by a 5 bit "state" code, which is found at line 17 of Table 1 and further described in the remarks that follow through line 36. There are 9 state codes that are defined. "ONL" indicates that the drive is "on line." "RBL" indicates that information from a failed drive is currently being "rebuilt" onto this drive. A rebuilding process may take place after a drive has failed, and the data that was lost from the failed drive is reconstructed on a drive that has been temporarily marked RBL. "DDD" indicates a "defunct disk drive." Each of these three disk drive states (ONL, RBL and DDD) are referred to as a "hard configured" state, because these states are only used to identify a disk drive that is part of the current system configuration (note, a defunct drive that is marked DDD is still considered to be part of the current system configuration, despite that fact that it has failed).

Drives that are in a "soft" configured state, are not part of the current system configuration and do not contain valid data. There are five such soft configured states. In the "HSP" or "hot spare" state, the drive is spinning and immediately available for use in the event that a currently active drive fails. In this case, the state of the "failed drive" is changed from ONL to DDD. Next, the state of the "hot spare drive" is changed from HSP to RBL and the state of the failed drive is changed from DDD to DHS, and the process of rebuilding the data that was lost from the failed drive begins. DHS is the "defunct hot spare" state. Unlike DDD, DHS is a soft configured state and, therefore, indicates that the drive is no longer part of the system configuration. Immediately thereafter, the state of the hot spare drive is changed from RBL to ONL and this drive is now part of the system configuration. The "SHS" state or "standby hot spare" state is similar to the HSP state, except that the drive is not spinning in this state.

The "RDY" state indicates that a drive is "ready", which means that the drive is available for use and can be moved into another state, such as the SHS state. Unlike the HSP state, a drive that is in the RDY state usually requires user intervention to move it to another state. The "SBY" state is similar to the RDY state, except that a drive in this state is not spinning. The RDY state is the default state for new hard disk drives that are inserted into the system, while the SBY state is the default state for a new tape or CD ROM drive.

The operating parameters also include an indication of the physical location of the drive, such as the "channel number" of line 42 and the "SCSI I.D." of line 43.

The channel number identifies the particular bus or bank that the drive has been configured for while the SCSI I.D., which may also be referred to as the "Target I.D.", identifies the particular slot or bay that the drive has been configured for. The "EMP" or "empty" state is not technically a drive state, but indicates that a particular bay is empty, i.e., no drive is installed in that bay.

The configuration data includes product identification and serial number field 107, which is found in line 38 of Table 1. The product I.D. and serial number information is assigned by the manufacturer of the disk drive unit and in many, but not all cases this information is stored at a predetermined address within the disk drive unit. When a disk drive unit is first configured and the configuration data is first saved, the system takes the manufacturer's product I.D. and serial number from the predetermined location and copies it into the product I.D. and serial number field of the configuration data. A user assigned disk drive unit identification field 108 is also part of the configuration data which, in Table 1, is located at line 161. At the time the disk drive units are first configured, the user is given an opportunity to enter a unique identification code for all disk drives. The user may, or may not, choose to assign such an identification code.

A time stamp that corresponds to the time that the configuration data is first saved is written into the time stamp field 109 of the configuration data. Time stamp field 109 is provided for the purpose of uniquely identifying the configuration of a disk drive in the event that the manufacturer either fails to assign the product I.D. and serial number information, or such information is stored at a non-standard address within the disk drive unit and, in addition, the user also fails to assign a unique user defined I.D. in field 108.

The update count in update count field 110 is initially set to one, and incremented each time the configuration data is changed; no matter how small the change. Although incrementing the update count is preferred, any other change to this field would be permissible, such as decrementing the count, as long as a unique update count number is assigned each time the configuration is changed.

A second disk drive unit 111 is illustrated in FIG. 1 as being connected to bus 101. Disk drive unit 111 is similar to disk drive unit 102, and includes power reset 112 and defect detection 113 subsystems similar to those of disk drive 102. Configuration data 114 is stored in disk drive 111 and includes operating parameters 115, product I.D. and serial number field 116, user assigned identification field 117, time stamp field 118 and update count field 119 similar to those of disk drive 102.

Both disk drive units 102 and 111 are designed to be "hot swapped" into and out of the RAID system, which means that they can be plugged into and unplugged from bus 101, all without turning the power off. Upon plugging one of the disk drive units into bus 101, power is picked up by the disk drive unit from the bus, thereby causing a power reset of the disk drive unit which, in turn, causes a power reset signal to be sent from the power reset subsystem (e.g., 103 or 112) out over the bus.

RAID controller 120 includes an internal bus 122 that is coupled to SCSI bus 101 via a bus interface unit 121. A processor 123, RAM 124 and ROM 125 are coupled to internal bus 122. A non-volatile memory 126 is also coupled to internal bus 122. Non-volatile memory 126 is preferable of the type commonly referred to as a non-volatile RAM or "NVRAM", which is typically a low power CMOS memory that is powered or backed-up by a battery, such that the information stored in the non-volatile memory will not be lost when the main power is switched off. A timer 127 is also coupled to internal bus 122 and is used to "time stamp" the configuration data of each of the disk drive units in the system. It is not necessary for timer 127 to keep time according to some standard method, such as 24 hour time. Instead, timer 127 may use some arbitrary time system in which the timer is simply incremented at some predetermined interval, such as 1.3 msec, which is the time interval used in a preferred embodiment.

Configuration data is not only stored in NVRAM 126, but also in a well known electrically erasable programmable read only memory (EEPROM) 128, which is also referred to as a "flash" memory. The flash memory 128, however, is only updated at power on, while any changes to the system configuration during operation are stored in NVRAM 124 and also entered into a "device change list", which is also stored in NVRAM and on each disk drive. This device change list is described in more detail below with regards to the description of Table 2 and later, with regards to FIG. 2.

Collectively, the elements of RAID controller 120, such as processor 123 and timer 127, as well as programs and data loaded into memories 124–126, provide the means for performing the various functions described below. Although this programmable computer subsystem is the preferred implementation for carrying out the functions described below, other embodiments may also be suitable, such as the use of discrete hardwired logic.

Each disk drive unit in the system (e.g., 102 and 111) stores, not only its own configuration data, but also configuration data for each and every disk drive unit in the system. Thus, in addition to the NVRAM and the flash memory, each disk drive unit has all the configuration data for the entire system. Furthermore, in addition to the configuration data for each of the disk drives, other system management information is also stored in each disk drive, typically in the last 16 sectors of the disk. This system management information is illustrated in Table 2, which is a code table that illustrates the various types of system management data that is stored in each disk.

Disk drives are physically attached to a RAID system by plugging them into open slots or bays, which are arranged in banks. Each bank is referred to as a "channel" and each bay has an associated "target I.D." As indicated in Table 2, system management information that is indicative of the particular target I.D. and channel that a drive has been configured for is stored in lines 3 and 4, respectively. In line 5, the configuration data, as described in more detail in Table 1, for each of the disk drives in the system is stored. Following the configuration data, a "device change list" is stored, as indicated in line 6. This device change list is described in more detail below with regards to FIG. 2.

Figure 2:
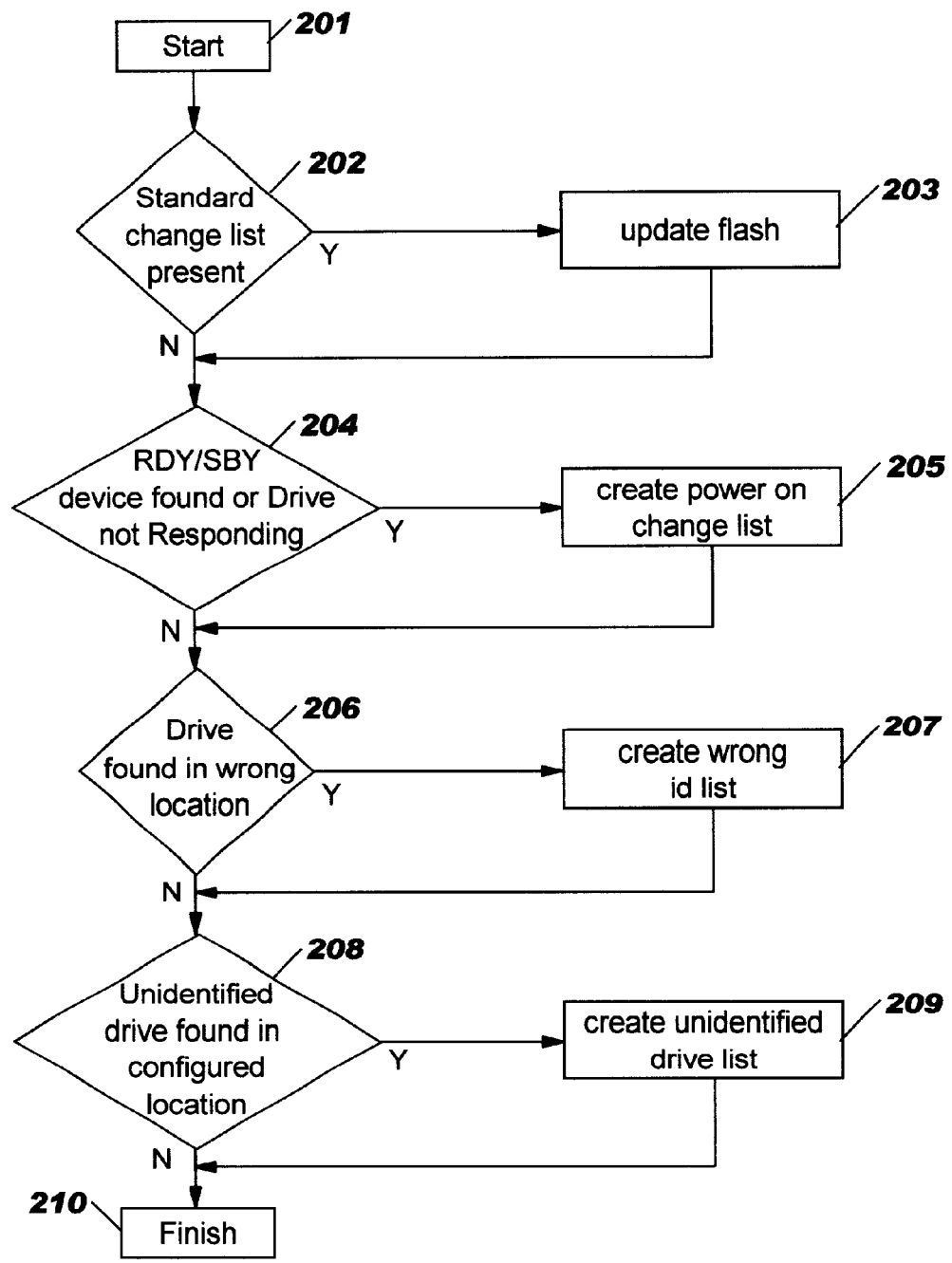
FIG. 2 is a flow diagram of the process that is executed at power on and that produces the various change lists.

After power up, the RAID controller 120 executes a power on self test routine ("POST"), which is stored in ROM 125 and which begins at step 201, as illustrated in FIG. 2. At next step 202, POST checks for a device change list in NVRAM and if one is found, branches to step 203 wherein flash memory 128 is updated with the latest changes to the configuration data, as recorded in the device change list. If configuration changes are made during system operation, the configuration data in the NVRAM is updated and the change in the configuration data is entered into the device change list. Although configuration data is also stored in flash memory 128, the flash memory is only updated with the latest configuration data after a reset of the RAID controller or at power on (i.e., at step 203). Thus, the device change list only includes the difference between the configuration data in the NVRAM and the configuration data in the flash memory. After the completion of step 203, the device change list is either deleted or modified in some fashion to indicate that there are no current differences between the configuration data in the NVRAM and the flash memory, such as by resetting all the entries in the device change list to zero.

In next step 204, RAID controller 120 looks for a new drive in a previously empty bay. More specifically, the RAID controller is looking for a target I.D. that is marked "EMP" (empty) in the current configuration and that now has a drive in it.

If such a new drive is found, it is entered into a "power on change list" at step 205. The RAID controller also looks for each drive of the current configuration. If the controller is unable to find a drive from the current configuration anywhere in the system, that missing drive is also entered into the power on change list at step 205.

In next step 206, RAID controller 120 determines if each hard configured drive of the current configuration is in its proper location (target I.D. and channel). If not, a "wrong I.D." list is created in step 207. And in next step 208, the controller looks for any drives that are not part of the current configuration and that are in hard configured locations; i.e., at target I.D.'s that are marked ONL or RBL in the current configuration. If such an unidentified drive is found, it is entered into an "unidentified drive" list in step 209.

Figure 3:
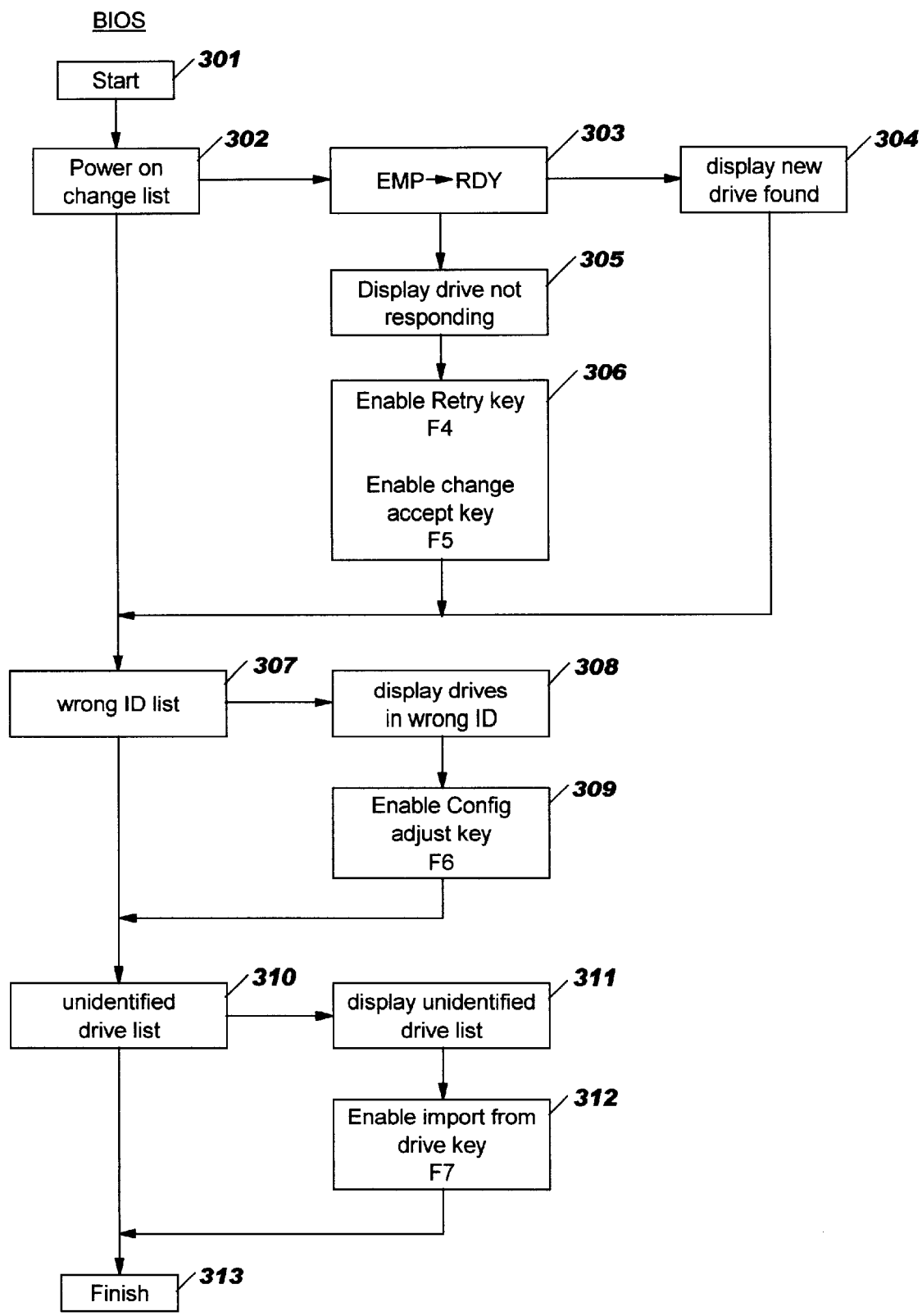
FIG. 3 is a flow diagram of the process that displays drive identification data for drives that are on a change lists, and enables various options for user responses to the various changes.

After completing the POST routine of FIG. 2 in which various change lists may be created, RAID controller BIOS will execute the routine of FIG. 3, which begins at step 301. At step 302, the controller looks for a power on change list and, if one is found, branches to step 303. At step 303, the controller looks for new drives in previously empty bays. In other words, bays that are marked "EMP" in the current configuration, but now have a drive marked "RDY" or "SBY." If such a drive is found, its identity is displayed to the user in step 304. More specifically, the old state, new state, channel and bay are displayed. The routine repeats steps 302, 303 and 304 until all such new drives have been displayed in step 304.

If, however, a previously configured drive is missing from the system, the program branches at step 303 to step 305 wherein the identity of the non-responding drive is displayed to the user. More specifically, the old state, new state, channel and bay are displayed, wherein the old state is the configured state, and the new state is the state that the controller will assign to the drive. In next step 306, the "F4" function key is enabled, which is a "retry" option. When F4 is enabled, it gives the user an opportunity to correct the problem and then select the F4 retry key. For example, a drive may not be responding simply because the user failed to insert the drive in the system. After the error message is displayed and the retry key enabled, the user may elect to insert the proper drive into the system and then select the retry key. In addition, the "F5" key is also enabled, which instructs the system to assign the new state, which is displayed on the screen, to the drive. The program repeats steps 302, 303, 305 and 306 until all non-responding drives have been displayed.

In next step 307, the controller checks for a wrong I.D. list, which indicates that a previously configured drive has been found, but in the wrong location. If such a drive is found, the program branches to step 308 wherein the identity of the drive is displayed. More specifically, the old channel and old bay are displayed, followed by the new channel and new bay location. In next step 309, the F6 key is enabled. The F6 key gives the user the option to adjust the configuration. In other words, the configuration data will be adjusted to reflect the new locations of the previously configured drives. In the alternative, the user may elect to physically relocate the drives, and then select the retry key. Steps 307, 308 and 309 are repeated until all "wrong I.D." drives have been displayed.

In next step 310, the program branches to step 311 if an unidentified drive list is found. In step 311, the identity of the unidentified drive is displayed. More specifically, the host I.D., old channel and old bay are displayed, followed by the new channel and new bay. The host I.D., old channel and old bay are from the drive (not from the NVRAM of the current controller 120), such that it identifies to the user the host I.D., channel and bay that the drive was previously configured for. In most cases, the host I.D., old channel and old bay will identify the system that the drive was previously installed in. The new channel and new bay are the channel and bay that the "unidentified" drive is currently installed in. In next step 312, the F7 key is enabled. In the alternative, selecting the F7 key causes the system to import the configuration from the unidentified drives and to update the configuration in controller 120. This choice is useful when the controller has been replaced, or when another system has failed and the disks from the failed system are moved to functional system.

UNATTENDED MODE OPERATION

The user may configure the system at setup time such that, when one or more function keys are enabled, the system will select one of the enabled functions automatically, thereby removing the need to press a function key. This mode of operation is useful when the system is in a remote location and not readily accessible to the user. If more than one function key is enabled, the function having the corresponding highest numbered function key will be automatically selected. For example, if all function keys are enabled, the function corresponding to the F7 key will be selected. If only the F6, F5 and F4 keys are enabled, than the function corresponding to the F6 key will be selected, If only the F4 key is enabled, however, no function will be automatically selected. Since the purpose of the F4 key is to allow the user to physically reconfigure the system, and physical reconfiguration can only be accomplished by the user, only the user can activate the function corresponding to the F4 key.

LOGICAL DRIVE MIGRATION ALOGRITHM

In a system with a RAID adapter, it would be desirable to have logical drive migration (LDM) wherein data could be migrated (add/remove physical disk devices) or the existing RAID level of a logical drive (array) could be changed to provide better fault tolerance for the data. This traditionally requires backing up the data, defining a new logical drive, and then restoring the data. This invention, however, allows a user to change the RAID level of an existing logical drive, or to migrate logical drive data by simply issuing an LDM command to the adapter, which then provides a redefined logical drive configuration structure.

Logical drive configuration structure information consists of data such as RAID level, state, number of chunks (areas of disk space), number of sectors of data available to a user, and details of each chunk specifying the disk's SCSI address, starting sector and number of sectors allocated to a logical drive. This invention also permits a user to migrate logical drive data belonging to one RAID level to another RAID level. The primary objective of this function is to provide a mechanism for changing RAID levels. It also allows, with some restrictions, shrinkage and expansion of the logical drive size.

The LDM algorithm imposes the following restrictions:
1. If data between source and destination structures overlap, then the source stripe ordering must be preserved.
2. Start Logical Block Address (LBA) of the first chunk (chunk O) of the destination logical drive must not be greater than the start LBA of the first chunk of the source logical drive that is to be migrated.
3. The stripe unit size of the source and destination logical drives must be the same.

The logical drive migration algorithm examines the number of source devices, the number of destination devices, the RAID level change requested and the associated stripe unit size to determine the start block, end block, and direction in which to migrate logical drive data. The algorithm decides whether Top Down (TD), Bottom UP (BU) or combinations of TD and BU are to be used as the direction in which data must be migrated to preserve data integrity. The definition of start block and end block, defining the LBA address, have a different meaning depending on the direction(s) of migration. For example, the start block for the BU direction defines the beginning LBA address of the last block, while start block for the TD directiondefines the beginning LBA address of the first block of data. Only one start and one end block address are defined when the data migration is only in one direction, BU or TD, but two start and two end block addresses are defined for data migration in combination directions, BU/TD or TD/BU. When migrating data, if the last stripe to be migrated is not on a full stripe boundary, then the last stripe is forced to be on a full stripe boundary, without corrupting data, by calculating adjustment to the blocks of the last stripe of data.

This algorithm is illustrated in FIG. 4, wherein the definitions of the various symbols are as follows:

Rx: existing RAID level
Ry: desired RAID level
DIR: direction (TD, BU)
TD: top down
BU: bottom up
SB1: start block address 1
SB2: start block address 2
EB1: end block address 1
EB2: end block address 2
NCS: number of chunks in source
NCD; number of chunks in destination
SUS: stripe unit size
SN: stripe number
EBS: end block source address
EBD: end block destination addrest

MANAGING DEFECTIVE MEDIA FOR RAID ADAPTOR

As described above, the RAID 5 algorithm spreads or "stripes" data across multiple physical drive. Each physical drive is made up of "stripe units" and these stripe units are combined across the physical drives to create a stripe of data. Each stripe of data also contains a parity stripe unit to allow reconstruction of data if a single drive failure occurs. Using this parity stripe unit, any stripe unit within the stripe can be reconstructed if a physical drive fails. A logical drive is made up of multiple stripes and a stripe is made up of multiple stripe units wherein each stripe unit is located on a unique physical drive.

When a single physical drive goes defunct and stripe units of data cannot be read from that drive, the data can be reconstructed using the stripe units of the remaining physical drives. A stripe is reconstructed by reading all stripe units in a stripe except the failed stripe unit and doing an exclusive or operation on the data. In the case of a disk rebuild operation, this data is written to a new replacement device designated by the end user. When a logical drive rebuild is performed, each stripe unit is reconstructed until all stripes within that logical drive have been rebuift. During RAID 5 rebuild operations if media errors are not handled correctly, the user can receive incorrect data from the RAID subsystem.

Media errors on a physical drive can occur that result in the device not being able to supply the requested data for a stripe unit. If a media error occurs during a logical drive rebuild, then the data on the stripe cannot be reconstructed. For example, if a media error occurred while reading a stripe unit on a first disk, then the corresponding (from the same stripe) stripe unit from the second disk could not be reconstructed. If this error is ignored, the next time the user accesses data in the stripe unit of the second disk, incorrect data will be supplied since it was not reconstructed correctly.

To avoid this problem, some RAID controllers report the device with the media errors as a dead device. When this occurs, the entire logical drive will go off line since the data can no longer be reconstructed (at this point there are 2 stripe units with unknown data). When a logical drive is off line, the user cannot access any data on that logical drive and all data on that logical drive is considered to have been lost. To bring the logical drive back online, the user must replace the device that has the media error, and restore the lost data.

To overcome this problem, this invention uses a table located in the adapter's NVRAM to keep track of stripes that could not be reconstructed uoccessfully. If a stripe could not be reconstructed successfully during a logical drive rebuild operation, an entry is made in a "bad stripe table" containing the logical drive and the stripe number that could not be rebuilt successfully. When the user tries to access data, this table is checked. If there is an entry in the bad stripe table for a stripe being accessed, the user will receive an error message. Although the user may lose a small portion of the data, the user is only presented with an error message instead of incorrect data. Also, if a user decides to reformat this portion of the disk, a disk formatting utility will also receive an error when accessing the portion of the disk in the bad stripe table. When this occurs, the formatting utility will reassign the failing area to another area on the logical drive. The bad stripe table can also be checked on write operations. If an entire stripe of data is written successfully and that stripe is found in the bad stripe table, the entry is removed. To write the entire stripe, sectors that have non-recoverable media errors need to be reassigned by the disk drive or Raid adapter.

This invention can be further enhanced to only keep track of the stripe unit that could not be rebuilt, or by determining which sector (a smaller portion of disk space than a stripe unit) is bad. When the bad sector is determined, only that sector is placed in the bad stripe table instead of the stripe unit or stripe number. The failing sector can be determined by doing single sector reads to the entire stripe unit or stripe number that is failing. If a sector read fails, then only that sector is placed in the bad stripe table. If a single sector write is done successfully to a sector that is contained in the bad stripe table, then the entry is removed from the table. To write a single sector, sectors that have non-recoverable media errors need to be reassigned by the disk drive or RAID Adapter.

The bad stripe table should also be stored on the physical drives attached to the controller. Each time an entry is made in the NVRAM bad stripe table, the bad stripe table is copied to a reserved area in each physical drive. If the physical drives are moved to another controller, the bad stripe table is copied from the physical drives reserved area to the new controller's NVRAM bad stripe table so that this information is not lost.

Another consideration is the layout of the bad stripe table. If there are a lot of entries in the bad stripe table, accessing the bad stripe table for each I/O command can slow down performance. The bad stripe table can be split into multiple tables for each logical or physical device. Also, each entry can be maintained in order and searched using a binary search algorithm.

TABLE 1

```
#define NCHNS 3
// Comments with
// ro/wi is read only write ignore field
// r/w is read write field
// ro is read only field
// ============================================================
typedef struct              // 36-byte SCSI device state
{
    UCHAR     ucInitiator;   // Initiator = 1, Target = 0, ro/wi
    UCHAR     ucParameters;  // Bits 0-4 device type: matches, ro/wi
                             // Inquiry cmd: 0=Disk, 1=Tape, etc.
                             // Bit 5:0 = 5 MHZ, 1 = Fast Scsi
                             // Bit 6:0 = 8 bit, 1 = 16 bit
                             // Bit 7:0 = no tag que, 1 = tag que
    UCHAR     ucMiscFlag;    // Bit 0 = PFA, ro/wi
                             // Bit 1 = Stale data
    UCHAR     ucState;       // 00=EMP, 04=DHS, 08=DDD, 01=SBY, r/w
                             // 81H=RDY, 85H=HSP, 89H=ONL, 8BH=RBL
                             // 05=SHS
                             // Bit 7 = Spin,
                             // Bit 3 = Configured,
                             // Bit 2 = HotSpare,
                             // Bit 1 = Rebuild in progress,
                             // Bit 0 = Present: true if device can
                             //    pass SCSI Test Unit Ready command.
                             // Bit 7 3 2 1 0 State
                             //    SPN CFG HSP RBL TUR
                             // 1 1 0 0 1 ONL
                             // 1 0 1 0 1 HSP
                             // 1 0 0 0 1 RDY
                             // 1 1 0 1 1 RBL
```

TABLE 1-continued

```
                                    // 0 1 0 0 0 DDD
                                    // 0 0 1 0 0 DHS
                                    // 0 0 0 0 1 SBY
                                    // 0 0 1 0 1 SHS
                                    // 0 0 0 0 0 EMP
    ULONG       ulBlockCount;       // Total # sectors not inc reserved, ro/wi
    UCHAR       ucDeviceID[28];     // Inquiry product id & serial number, ro/wi
} DEVSTATE;
typedef struct
{
    UCHAR       ucChn;              // Channel number: 0 - NCHNS-1, r/w
    UCHAR       ucTgt;              // SCSI id     R←:0 - MAX_TGT-1, r/w
    USHORT      usMisc;             // set to zero except in CHUNK[0], CHUNK[1] and
                                    // CHUNK[2].
                                    // CHUNK[3] is in each logical drive is reserved for
                                    // client server admin.
                                    // In CHUNK[0] and CHUNK[1] it is as follows
                                    //          // bits 1 0:00 ch 0, lo id => bank 0
                                    //          //      01 ch 0, lo id => bank 1
                                    //          //      10 ch 0, lo id => bank 2
                                    //          // bits 3 2:00 ch 0, hi id => bank 0
                                    //          //      01 ch 0, hi id => bank 1
                                    //          //      10 ch 0, hi id => bank 2
                                    //          // bits 5 4:00 ch 1, lo id => bank 0
                                    //          //      01 ch 1, lo id => bank 1
                                    //          //      10 ch 1, lo id => bank 2
                                    //          // bits 76:00 ch 1, hi id => bank 0
                                    //          //      01 ch 1, hi id => bank 1
                                    //          //      10 ch 1, hi id => bank 2
                                    //          // bits 9 8:00 ch 2, lo id => bank 0
                                    //          //      01 ch 2, lo id => bank 1
                                    //          //      10 ch 2, lo id => bank 2
                                    //          // bits b a:00 ch 2, hi id => bank 0
                                    //          //      01 ch 2, hi id => bank 1
                                    //          //      10 ch 2, hi id => bank 2
                                    //          // bits d c:00 ch 3, lo id => bank 0
                                    //          //      01 ch 3, lo id => bank 1
                                    //          //      10 ch 3, lo id => bank 2
                                    //          // bits f e:00 ch 3, hi id => bank 0
                                    //          //      01 ch 3, hi id => bank 1
                                    //          //      10 ch 3, hi id => bank 2
                                    // Adapter does not process these bits.
                                    // It is user defined
    ULONG       ulStartSect;        // Start sector for this logical drive, r/w
    ULONG       ulNoOfSects;        // No. of sectors allocated to this log drv, r/w
} CHUNK;
typedef struct
{
    USHORT      usUserField;        // User defined, r/w
    UCHAR       ucState;            // Current status of logical drive = r/w
                                    // 03H - OKaY
                                    // 04H - CRiTical
                                    // 02H - OFfLine
                                    // 00h - FREe
                                    // 05H - LDM
                                    // 06H - SYS
                                    // 24H - CRS (Critical SYS)
                                    // 14H - CRM (Critical LDM)
    UCHAR       ucRaidCacheParam;
                                    // bits 2–0 - Raid level (0,1,5) r/w
                                    // bit 3–6 - 0
                                    // bit 7 –1 => Write-Back
                                    //       0 => Write-Through
    UCHAR       ucNoOfChunkUnits;   // No. of chunk units in parity band 1 to 16, r/w
    UCHAR       ucStripeSize;       // 0–3 reserved for future expansion, r/w
                                    // 4 = 8K stripe unit
                                    // 5 = 16K stripe unit
                                    // 6 = 32K stripe unit
                                    // 7 = 64K stripe unit
                                    // 8+ reserved for future
                                    // NOTE: RAID Adapter RF supports 8K to 64K stripe.
    UCHAR       ucParams;           // bit 0-0, reserved
                                    // bit 2-0 data scrubbing is enabled
                                    //       1 data scrubbing is disabled
                                    // bit 3 - cache bypass on read, ro
                                    // bit 4 - 0 copy of write data also in Posiedon, r/w
                                    //       1 dual copy disabled
                                    // bit 5 - 0 read-ahead enabled, r/w
                                    //       1 read-ahead disabled
```

TABLE 1-continued

```
                                    // bit 6 - 0 Reserved
                                    // bits 1 and 7 = 0 reserved tor future
    UCHAR       ucReserved;         // used by the configurator
    ULONG       ulLogDrvSize;       // size of the logical drive, ro
    CHUNK       chunk[MAX_CHUNKS];  // details of each chunk unit
} LOGICALDRIVE;
typedef struct
{
    UCHAR       board_disc[8];      // board description in ascii. For RAID Adapter RF ro
                                    // this field is 'CPH RF3C'
    UCHAR       processor[8];       // local processor description in ascii. ro
                                    // For RAID Adapter RF this field is '403GC-33'
    UCHAR       ucNoChanType;       // bits 0-3 - number of I/O (SCSI) channels, ro
                                    // bits 4-6 - channel type, ro
                                    //      000 parallel SCSI wide
                                    //      note: RAID Adapter RF only
                                    //      supports parallel wide SCSI
                                    //      001 parallel SCSI narrow
                                    //      010 serial SSA
                                    //      011 serial P1394
                                    //      100 serial FC-AL
                                    // bit 7    -0 reserved for future
    UCHAR       ucNoHostIntType;    // number and type of host interface, ro
                                    // bits 0-3 - number of host interface
                                    // bits 4-6 - interface type
                                    //      000 32 bit PCI
                                    //      001 64 bit PCI
                                    //      010 80 MB/sec Micro Channel
                                    //      011 40 MB/sec Micro Channel
                                    //      101 EISA
                                    // bit 7    -0 reserved for future
    UCHAR       ucCompression;      // type of compression hardware, 0 for none, ro
    UCHAR       ucNvramType;        // NVRAM cache type, 0 for no cache nvram, ro
                                    //          1 for Posiedon, ro
    ULONG       ulNvramSize;        // size of nvram in sectors when present, ro
} HARDWAREDISC;
typedef struct
{
    UCHAR       ucNoOfLogDrives;    // No. of logical drives: 1-8, r/w
    UCHAR       ucDateD;            // date of configuration written, r/w
    UCHAR       ucDateM;            // date of configuration written, r/w
    UCHAR       ucDateY;            // date of configuration written, r/w
                                    // packed ddmmyy
    UCHAR       init_id[ 4 ];       // Initiator Id
                                    // bits 0-4
                                    // Speed bits 5-7
                                    // 000 xxxxx - 10MHz
                                    // 001 xxxxx - 20MHz
                                    // 010 xxxxx - 5MHz
                                    // 111 xxxxx - 0MHz
    UCHAR       host_id[ 12 ];      // Chassis # from host, r/w
    UCHAR       time_sign[ 8 ];     // Time stamp from RAID Adapter RF clock, ro
    struct
    {
      UINT      cfgdrv_updcnt   16; // count of cfgupdate since write cfg
      UINT      startup_delay   :4; // delay (sec) between spinup groups
      UINT      concur_drvstart :4; // # of drives to spinup in parallel
      UINT      reserved        :3; // reserved
      UINT      stage           :1; // 1 = stage data during migration
      UINT      cluster         :1; // 1 = adapter is part of a cluster
      UINT      bios_compat     :1; // 1 = compatibility, 0 = extended
      UINT      boot_cdr        :1; // 1 = boot from CDROM, 0 = from drive
      UINT      auto_rearrange  :1; // 1 = auto rearrange, 0 = just list
    }UserOpt;
    USHORT      user_field;         // User defined
    UCHAR       ucRebuildRate;      // Rebuild Rate, r/w
                                    // 01h=low, 08h=mid, 0Fh=high
    UCHAR       ucReserve;          // set to zero
} CONFHDR;
typedef struct
{
    CONFHDR         configheader;                   // configuration header
    HARDWAREDISC    hardware_disc;                  // hardware description
    LOGICALDRIVE    logical_drive[ MAX_            // describing each logical
                    LOG_DRVS ];                     // drv
    DEVSTATE        dev[ NCHNS ]                    // Info about device at
                    [ MAX_TGT + 1 ];                // each adr
} CONFIGURATION;
```

TABLE 2

| | | |
|---|---|---|
| UCHAR | ucRepTblCnt; | //Number of entries in ReplacementTb1 |
| UCHAR | ucDevChgCnt; | |
| UCHAR | tgt; | //SCSI Target ID |
| UCHAR | chn; | //SCSI Channel |
| CONFIGURATION | cfg; | //Full copy of configuration struct |
| DEVCHGLST | DeviceChangeList[ MAX_DEV_CHG_LST ]; | |
| RTENTRY | ReplacementTbl[ MAX_LOG_DRVS ]; | |

What is claimed is:

1. In a RAID system for use with removable and identifiable storage devices that can be attached to said RAID system at a plurality of different attachment points, the method of migrating data in a logical media drive comprising the steps of:

determining that the source RAID level is one;

determining that the destination RAID level is five;

determining that a number of destination devices to which data is to be migrated is greater than a number of source devices from which data is to be migrated, plus one;

determining that the number of migrations required to migrate all of the data while preserving data integrity is two;

determining that the direction of a first migration is from bottom up;

determining that the direction of a second migration is from top down;

defining a start logical block address of the first migration to be a stripe unit size times the number of destination devices minus two times the stripe unit size;

defining the end logical block address of the first migration to be zero;

defining a start logical block address of the second migration to be the stripe unit size times the number of destination devices minus the stripe unit size;

defining the end logical block address of the second migration to be the lesser of a logical source end block address and a logical destination end block address;

performing each migration by moving data from the source physical blocks to the destination physical blocks starting with the physical block corresponding to the start logical block address and continuing to the physical block corresponding to the end logical block address.

2. In a RAID system for use with removable and identifiable storage devices that can be attached to said RAID system at a plurality of different attachment points, the method of migrating data in a logical media drive comprising the steps of:

determining that the source RAID level is one;

determining that the destination RAID level is five;

determining that a number of source devices from which data is to be migrated is less than twice a number of destination devices from which data is to be migrated, minus two;

determining that the number of migrations required to migrate all of the data while preserving data integrity is two;

determining that the direction of a first migration is from bottom up;

determining that the direction of a second migration is from top down;

defining a start logical block address of the first migration to be a stripe unit size times the number of destination devices minus two times the stripe unit size;

defining the end logical block address of the first migration to be zero;

defining a start logical block address of the second migration to be the stripe unit size times the number of destination devices minus the stripe unit size;

defining the end logical block address of the second migration to be the lesser of a logical source end block address and a logical destination end block address;

performing each migration by moving data from the source physical blocks to the destination physical blocks starting with the physical block corresponding to the start logical block address and continuing to the physical block corresponding to the end logical block address.

3. In a RAID system for use with removable and identifiable storage devices that can be attached to said RAID system at a plurality of different attachment points, the method of migrating data in a logical media drive comprising the steps of:

determining that the source RAID level is five;

determining that the destination RAID level is one;

determining that a number of destination devices to which data is to be migrated is less than or equal to a number of source devices from which data is to be migrated, minus two;

determining that the number of migrations required to migrate all of the data while preserving data integrity is two;

determining that the direction of a first migration is from top down;

determining that the direction of a second migration is from bottom up;

defining a start logical block address of the first migration to be zero;

defining the end logical block address of the first migration to be a stripe unit size times the number of destination devices minus the stripe unit size;

defining a start logical block address of the second migration to be the lesser of a logical source end block address and a logical destination end block address;

defining the end logical block address of the second migration to be the stripe unit size times the number of destination devices;

performing each migration by moving data from the source physical blocks to the destination physical blocks starting with the physical block corresponding to the start logical block address and continuing to the physical block corresponding to the end logical block address.

4. In a RAID system for use with removable and identifiable storage devices that can be attached to said RAID system at a plurality of different attachment points, the method of migrating data in a logical media drive comprising the steps of:

determining that the source RAID level is five;

determining that the destination RAID level is one;

determining that a number of destination devices to which data is to be migrated is less than two times a number of source devices from which data is to be migrated, minus two;

determining that the number of migrations required to migrate all of the data while preserving data integrity is two;

determining that the direction of a first migration is from top down;

determining that the direction of a second migration is from bottom up;

defining a start logical block address of the first migration to be zero;

defining the end logical block address of the first migration to be a stripe unit size times the number of destination devices minus the stripe unit size;

defining a start logical block address of the second migration to be the lesser of a logical source end block address and a logical destination end block address;

defining the end logical block address of the second migration to be the stripe unit size times the number of destination devices;

performing each migration by moving data from the source physical blocks to the destination physical blocks starting with the physical block corresponding to the start logical block address and continuing to the physical block corresponding to the end logical block address.

5. In a RAID system for use with removable and identifiable storage devices that can be attached to said RAID system at a plurality of different attachment points, the method of migrating data in a logical media drive comprising the steps of:

determining that the source RAID level is five;

determining that the destination RAID level is five;

determining that a number of destination devices to which data is to be migrated is less than a number of source devices from which data is to be migrated;

determining that the number of migrations required to migrate all of the data while preserving data integrity is two;

determining that the direction of a first migration is from top down;

determining that the direction of a second migration is from bottom up;

defining a start logical block address of the first migration to be zero;

defining the end logical block address of the first migration to be a stripe unit size times the number of destination devices minus two times the stripe unit size;

defining a start logical block address of the second migration to be the lesser of a logical source end block address and a logical destination end block address;

defining the end logical block address of the second migration to be the stripe unit size times the number of destination devices minus the stripe unit size;

performing each migration by moving data from the source physical blocks to the destination physical blocks starting with the physical block corresponding to the start logical block address and continuing to the physical block corresponding to the end logical block address.

* * * * *